(12) United States Patent
Kubota et al.

(10) Patent No.: US 9,069,348 B2
(45) Date of Patent: Jun. 30, 2015

(54) PORTABLE REMOTE CONTROLLER AND ROBOTIC SYSTEM

(75) Inventors: Yumie Kubota, Fukuoka (JP); Seishiro Sakaguchi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 661 days.

(21) Appl. No.: 13/316,558

(22) Filed: Dec. 12, 2011

(65) Prior Publication Data

US 2013/0041504 A1    Feb. 14, 2013

(30) Foreign Application Priority Data

Aug. 11, 2011    (JP) .................................. 2011-175952

(51) Int. Cl.
 *G05B 19/04* (2006.01)
 *G05B 19/409* (2006.01)
 *G06F 9/44* (2006.01)

(52) U.S. Cl.
 CPC ................ *G05B 19/409* (2013.01); *G06F 8/33* (2013.01)

(58) Field of Classification Search
 CPC ...... B25J 9/1656; B25J 9/1658; B25J 9/1661; B25J 9/1671; G05B 2219/40479; G05B 2219/40123
 USPC ....................................................... 700/264
 See application file for complete search history.

(56) References Cited

U.S. PATENT DOCUMENTS

| | | | |
|---|---|---|---|
| 5,485,552 A * | 1/1996 | Mizuno et al. ................. | 700/264 |
| 6,026,233 A | 2/2000 | Shulman et al. | |
| 6,711,448 B2 * | 3/2004 | Misawa et al. .................. | 700/83 |
| 6,853,881 B2 * | 2/2005 | Watanabe et al. ............. | 700/264 |
| 7,430,457 B2 * | 9/2008 | Watanabe et al. ............. | 700/264 |
| 2002/0184611 A1 * | 12/2002 | Endejan ........................ | 717/113 |
| 2008/0295083 A1 | 11/2008 | Meijer et al. | |
| 2009/0241047 A1 | 9/2009 | Kuwahara et al. | |
| 2009/0327942 A1 * | 12/2009 | Eldridge et al. .............. | 715/771 |

FOREIGN PATENT DOCUMENTS

| | | |
|---|---|---|
| EP | 2256623 | 12/2010 |
| JP | 03-17711 | 1/1991 |
| JP | 04-131912 | 5/1992 |

(Continued)

OTHER PUBLICATIONS

D. Fritz, "PC-DNC Editor for Windows Operator's manual," Suburban Machinery Software, Inc., Copyright 1997-2005. [online with archive date of Jan. 6, 2007] [Available: https://web.archive.org/web/20070106193823/http://sub-soft.com/download/Editor_demo/PC-DNC_Editor_manual.pdf].*

(Continued)

*Primary Examiner* — Thomas G Black
*Assistant Examiner* — Peter D Nolan
(74) *Attorney, Agent, or Firm* — Mori & Ward, LLP

(57) ABSTRACT

A portable remote controller includes a display color setting unit, a display color information storage unit, and a teaching data display unit. The display color setting unit sets display colors for instructions for making a robot execute a predetermined behavior. The display color information storage unit stores the display colors set by the display color setting unit in association with the instructions. The teaching data display unit displays teaching data created by teaching on a display unit on the basis of the display colors.

12 Claims, 8 Drawing Sheets

(56) References Cited

FOREIGN PATENT DOCUMENTS

| | | |
|---|---|---|
| JP | 2716684 B2 | 3/1997 |
| JP | H10-254527 | 9/1998 |
| JP | 2003-255811 | 9/2003 |
| JP | 2004-227028 | 8/2004 |
| JP | 2005-92571 | 4/2005 |
| WO | WO 2006/100940 | 9/2006 |

OTHER PUBLICATIONS

"G-code." Wikipedia. Archive.org, Dec. 2, 2007. Web. Nov. 6, 2014.*

Extended European Search Report for corresponding EP Application No. 12152555.4-1239, Dec. 11, 2012.

Japanese Office Action for corresponding JP Application No. 2011-175952, Dec. 17, 2013.

Japanese Office Action for corresponding JP Application No. 2011-175952, Jul. 30, 2013.

Chinese Office Action for corresponding CN Application No. 201210020067.2, Sep. 1, 2014.

Chinese Office Action for corresponding CN Application No. 201210020067.2, Apr. 28, 2015.

* cited by examiner

| INSTRUCTION NAME | COLOR NAME | COLOR NUMBER | ... |
|---|---|---|---|
| MOVE INSTRUCTION | BLUE | 210 | ... |
| WORK INSTRUCTION | RED | 35 | ... |
| COMMENT INSTRUCTION | GREEN | 191 | ... |
| ⋮ | ⋮ | ⋮ | |

FIG.10

| INSTRUCTION NAME | COLOR NAME | COLOR NUMBER | PRIORITY | ... |
|---|---|---|---|---|
| A INSTRUCTION | BLUE | 101 | 1 | ... |
| B INSTRUCTION | RED | 102 | 3 | ... |
| C INSTRUCTION | GREEN | 103 | 2 | ... |
| D INSTRUCTION | YELLOW | 104 | 4 | ... |
| E INSTRUCTION | PURPLE | 105 | 3 | ... |
| F INSTRUCTION | PINK | 106 | 2 | ... |
| ⋮ | ⋮ | ⋮ | ⋮ | |

PORTABLE REMOTE CONTROLLER AND ROBOTIC SYSTEM

CROSS-REFERENCE TO RELATED APPLICATION

This application is based upon and claims the benefit of priority of the prior Japanese Patent Application No. 2011-175952, filed on Aug. 11, 2011; the entire contents of which are incorporated herein by reference.

FIELD

The embodiments discussed herein are directed to a portable remote controller and a robotic system.

BACKGROUND

There has been known a conventional portable remote controller that creates a program (hereinafter, "teaching") for actuating an industrial robot and replays teaching data created by the teaching to make the industrial robot operate.

For example, there has been proposed a portable remote controller that can switch a mode from a display mode to an edit mode and can edit teaching data to copy or paste the teaching data by touching a predetermined portion of a display unit.

The conventional technology has been known as disclosed in, for example, Japanese Laid-open Patent Publication No. H10-254527.

However, the above conventional technology has a problem in that it takes much time to search a desired command from teaching data because the teaching data are displayed in a similar style when a worker edits the teaching data.

SUMMARY

A portable remote controller includes a display color setting unit, a display color information storage unit, and a teaching data display unit. The display color setting unit sets display colors for instructions for making a robot execute a predetermined behavior. The display color information storage unit stores the display colors set by the display color setting unit in association with the instructions. The teaching data display unit displays teaching data created by teaching on a display unit on the basis of the display colors.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 10 is a diagram illustrating an example of display color information according to a second embodiment.

DESCRIPTION OF EMBODIMENTS

First Embodiment

Figure 1:
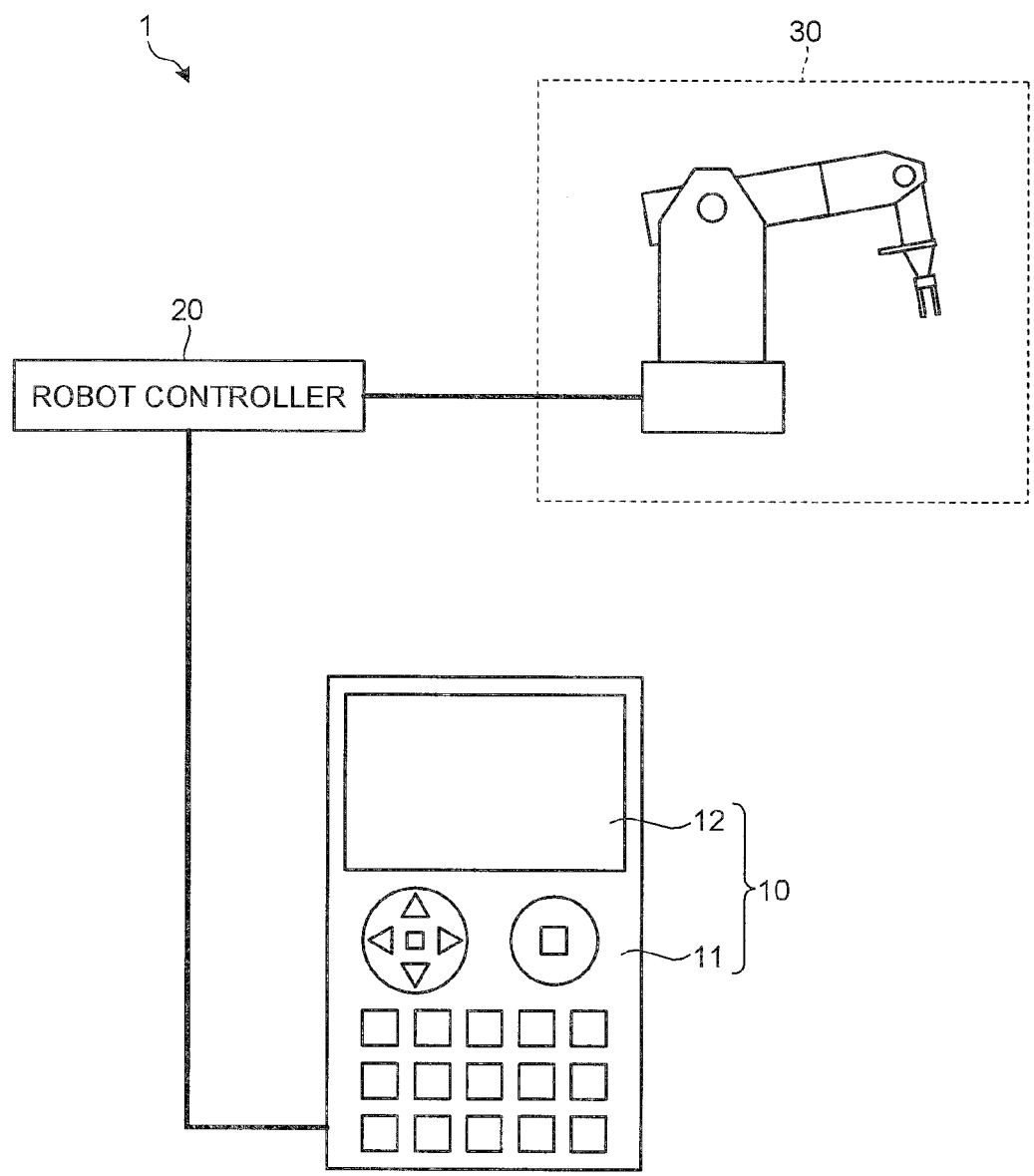
FIG. 1 is an explanation diagram of a robotic system according to a first embodiment.

FIG. 1 is an explanation diagram of a robotic system 1 according to the first embodiment. In FIG. 1, a part of the robotic system 1 is simplified for easy explanation.

As illustrated in FIG. 1, the robotic system 1 according to the first embodiment includes a portable remote controller 10, a robot controller 20, and a robot 30. In this case, the portable remote controller 10 and the robot controller 20 are connected to each other by using a cable, for example. Moreover, the robot controller 20 and the robot 30 are connected to each other by using a cable, for example.

The portable remote controller 10 is an input-output terminal for the robot controller 20, which is generally referred to as a teaching pendant. For example, the portable remote controller 10 is a portable operating device that creates a program (hereinafter, "teaching") for actuating the robot 30. Moreover, the portable remote controller 10 replays teaching data recorded by the teaching by way of the robot controller 20 and makes the robot 30 perform a series of behaviors.

The portable remote controller 10 is constituted by various types of switches and buttons. The portable remote controller 10 includes an operating unit 11 that performs operations such as teaching and a display unit 12 that displays teaching data during teaching, a control state of the robot 30, and the like.

The robot controller 20 is a control device that controls behaviors such as starting and stopping of the robot 30. Moreover, the robot controller 20 can also replay teaching and teaching data.

The robot 30 is an industrial robot called a manipulator. The robot 30 is a device that performs behaviors such as grip and transfer of a workpiece by replaying teaching data taught by the portable remote controller 10 or the robot controller 20.

Herein, when teaching must be performed during replaying teaching data for some reason, for example, when a workpiece is changed, a worker performs the teaching by using the portable remote controller 10.

It is preferable that the installation location of the robotic system 1 saves the movable range of the robot 30. Moreover, it is preferable that the installation location saves a loading location of a workpiece and a loading location of a spare workpiece. For this reason, the portable remote controller 10 can perform teaching in the narrow place in some cases.

Because the portable remote controller 10 is generally operated in a handheld mode, the portable remote controller has a compact configuration. Along with this, a screen of the display unit 12 included in the portable remote controller 10 is a very small screen as compared to a display of a personal computer.

Moreover, the teaching data created during teaching are described with instructions that have an enormous amount of lines. Teaching data can exceed 100,000 lines depending on a series of behaviors performed by the robot 30.

However, in a conventional robotic system, teaching data are displayed on a display unit in a similar style despite a small screen. For this reason, in the conventional robotic system, it is difficult and takes time that a worker searches for a desired command and modification place from teaching data that have an enormous amount of lines.

Therefore, the conventional robotic system causes the degradation of work efficiency. In this case, a command is an instruction that is described as teaching data when a worker performs teaching. Each instruction corresponds to a behavior of the robot 30.

To solve the problem, the portable remote controller 10 and the robotic system 1 according to the first embodiment displays teaching data on the basis of a display color set for each command when displaying the teaching data on the display unit 12. As a result, the portable remote controller 10 and the robotic system 1 according to the first embodiment can easily visually recognize a command from the teaching data displayed on the display unit 12.

Figure 2:
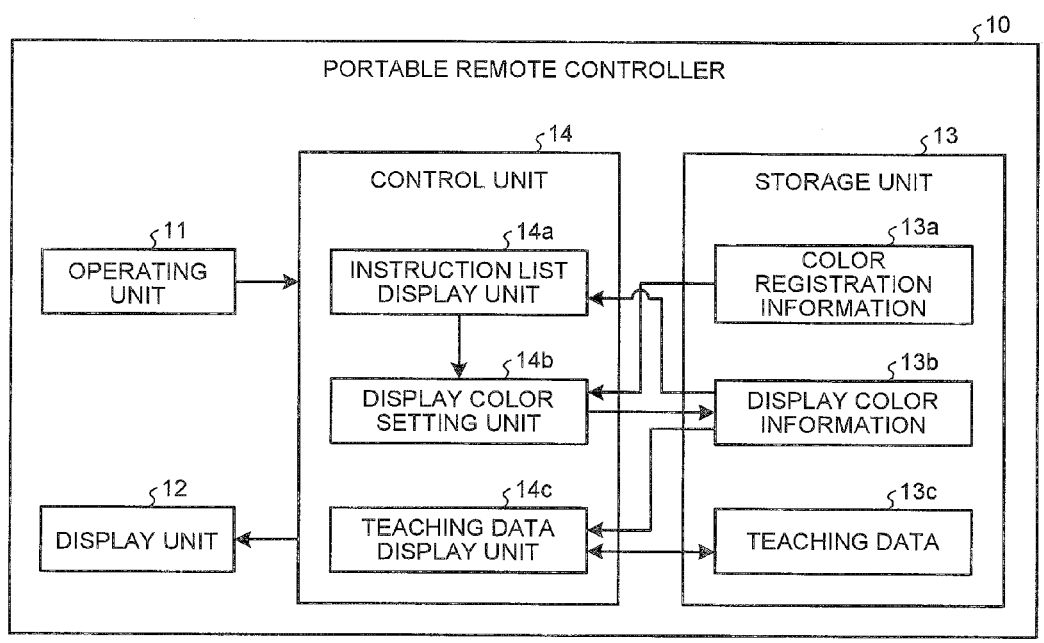
FIG. 2 is a block diagram illustrating the configuration of a portable remote controller according to the first embodiment.

Next, the configuration of the portable remote controller 10 according to the first embodiment will be explained in detail with reference to FIG. 2. FIG. 2 is a block diagram illustrating the configuration of the portable remote controller 10 according to the first embodiment.

The portable remote controller 10 includes the operating unit 11, the display unit 12, a storage unit 13 and, a control unit 14. The control unit 14 includes an instruction list display unit 14*a*, a display color setting unit 14*b*, and a teaching data display unit 14*c*. The storage unit 13 stores therein color registration information 13*a*, display color information 13*b*, and teaching data 13*c*.

The operating unit 11 is an input device that inputs teaching data when performing teaching or that replays the teaching data. For example, the operating unit 11 is a keyboard that includes various types of switches and buttons.

The display unit 12 is a display device of the portable remote controller 10 that displays control states and teaching data of the robot 30. For example, the display unit 12 includes a liquid crystal display, a speaker, or the like. The display unit 12 may be a display that includes a touch panel that can detect a pressing position in various methods such as a pressure-sensitive type and a capacitive type.

The storage unit 13 is a storage device such as RAM (Random Access Memory) and a nonvolatile memory. The storage unit 13 stores the color registration information 13*a*, the display color information 13*b*, and the teaching data 13*c*.

The color registration information 13*a* is information on a display color. For example, the information includes a color name, a color number, an RGB value, list display identification, and the like, and is previously registered by a worker. Herein, the list display identification is an identifier that indicates whether a color is displayed on a list of colors when the list of colors that can be set by the display color setting unit 14*b* is displayed.

Specifically, when for example 256 colors are registered in the color registration information 13*a*, it is assumed that the list display identification is registered as "the possible" for ten colors selected highly frequently. In this case, if a display color setting operation is performed by the worker, the display color setting unit 14*b* displays a list only for ten colors for which list display identification is registered as "the possible".

Figures 7, 8:
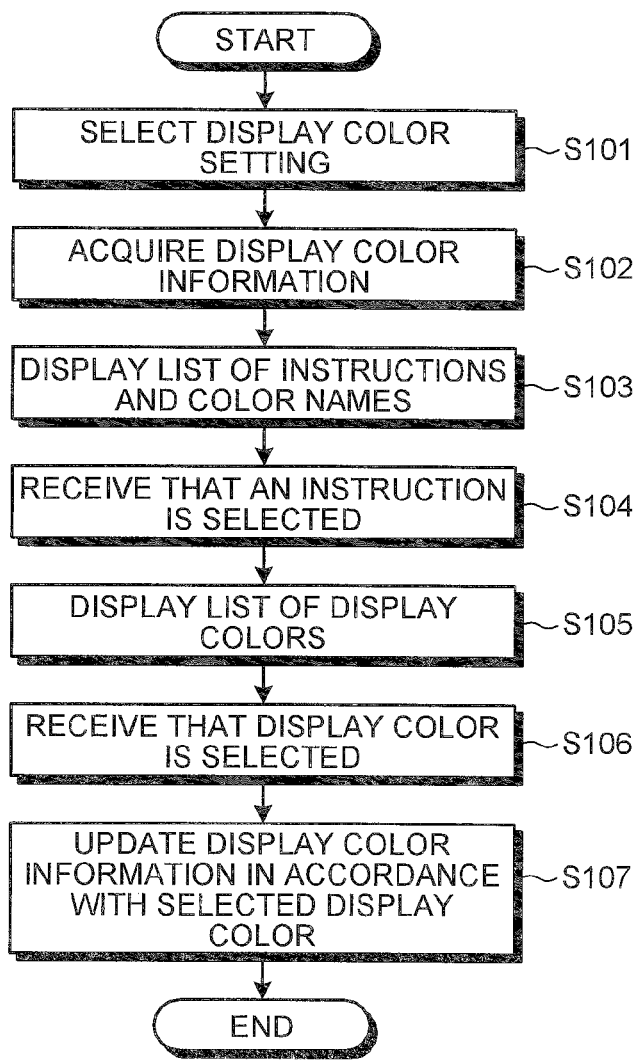
FIG. 7 is a diagram illustrating an example of display color information according to the first embodiment.
FIG. 8 is a flowchart illustrating the routines of a display color setting process according to the first embodiment.

The display color information 13*b* is color information set by the display color setting unit 14*b* for each instruction and stores a color name and a color number in association with an instruction. Herein, the details of the display color information 13*b* are explained with reference to FIG. 7. FIG. 7 is a diagram illustrating an example of the display color information 13*b* according to the first embodiment.

As illustrated in FIG. 7, the display color information 13*b* includes an "instruction name" item, a "color name" item, and a "color number" item. The "instruction name" item is a name for an instruction for setting a display color. The "color name" item is a name for a color given to a predetermined color.

The "color number" item corresponds to the "color number" registered in the color registration information 13*a*. Specifically, it is explained about the case where "color name: blue" is registered in the color registration information 13*a* in correspondence with "color number: 210".

In this case, as illustrated in the second line of FIG. 7, if a display color of "color name: blue" is set for a "move instruction", the display color information 13*b* stores "color name: blue, color number: 210" in association with "instruction name: move instruction". In this way, the display color information 13*b* stores color information (color name and color number) set for each instruction.

Herein, it has been explained that the portable remote controller 10 includes the storage unit 13. However, an external medium such as a USB (Universal Serial Bus) memory and an SD (Secure Digital) card may store the teaching data 13*c* and the like described above.

Returning to FIG. 2, the configuration of the portable remote controller 10 is continuously explained. The teaching data 13*c* is the collective of instructions that makes the robot 30 perform a series of behaviors.

A series of behaviors to be performed by the robot 30 is below described as a "job". The teaching data 13*c* is managed in association with each job. For example, a file name is given to the teaching data 13*c* by using a job identifier.

The control unit 14 totally controls the portable remote controller 10 that is an operating device that performs teaching. The instruction list display unit 14*a* is a processing unit that performs a process for making the display unit 12 display an instruction list by which display colors acquired from the display color information 13*b* can be set and display colors that are associated with instructions.

When an operation for setting a display color associated with a predetermined instruction is performed by the operating unit 11, the display color setting unit 14*b* is a processing unit that performs a process for updating color information (color name and color number) of the display color information 13*b* corresponding to an instruction by using the set display color.

The teaching data display unit 14*c* is a processing unit that performs a process for displaying the teaching data 13*c* on the display unit 12 on the basis of the color information set in the display color information 13*b* if a display instruction of the predetermined teaching data 13*c* is received from a main menu or the like.

Specifically, when a file name of the teaching data 13*c* is selected by the worker or when a job identifier is selected by the worker, the teaching data display unit 14*c* receives a display instruction for the teaching data 13*c* of the file name or the job.

If the display instruction for the teaching data 13*c* is received from the main menu or the like, the teaching data display unit 14*c* also performs a process for displaying the teaching data 13*c* on the display unit 12 in accordance with a display mode.

The display mode includes a "play" mode that indicates that the teaching data 13*c* is being replayed and a "teaching"

mode that indicates that teaching is performed, namely, the teaching data 13c is being edited.

Figure 3:
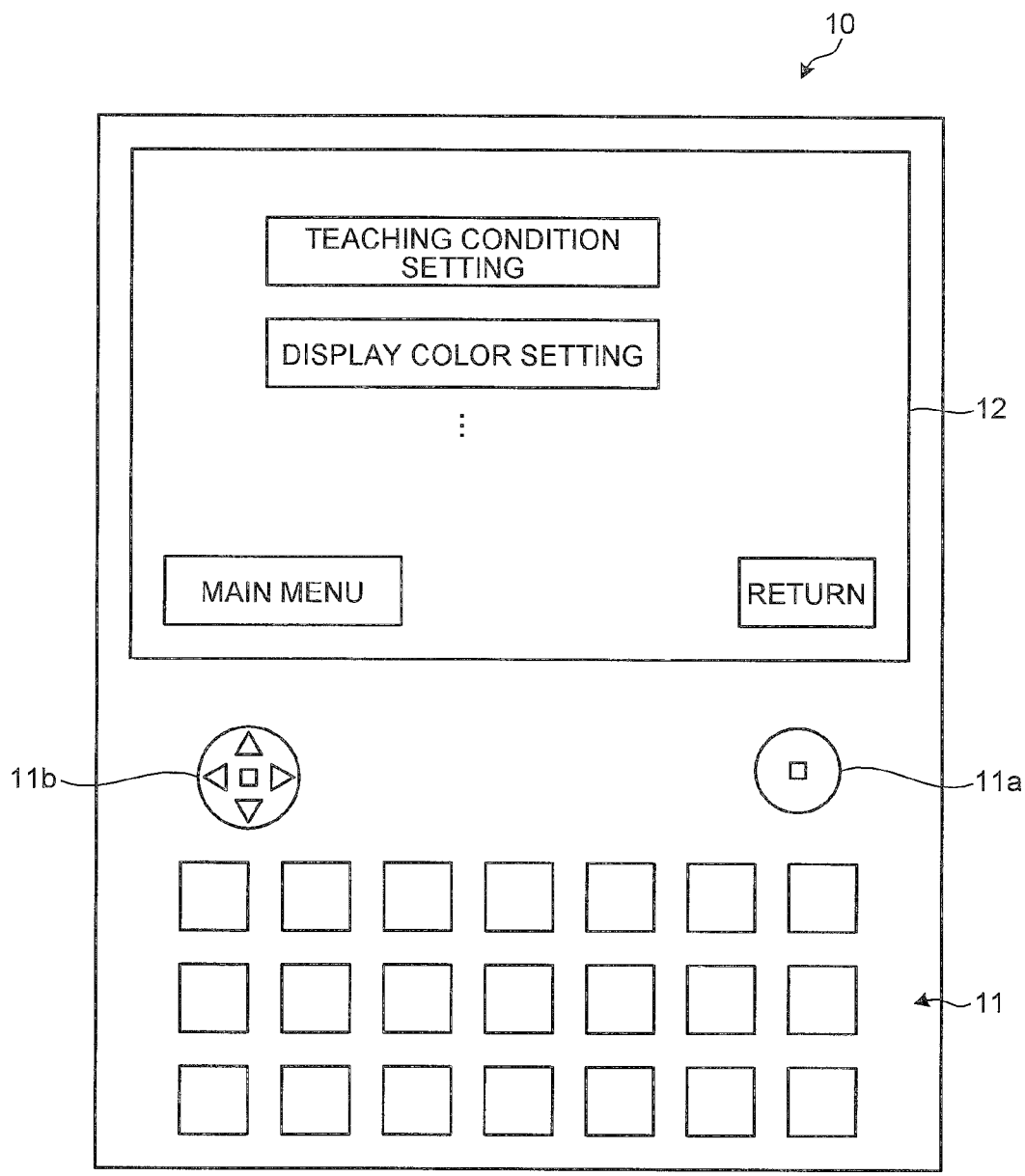
FIG. 3 is a diagram illustrating an example of a process selection screen according to the first embodiment.
Figure 4:
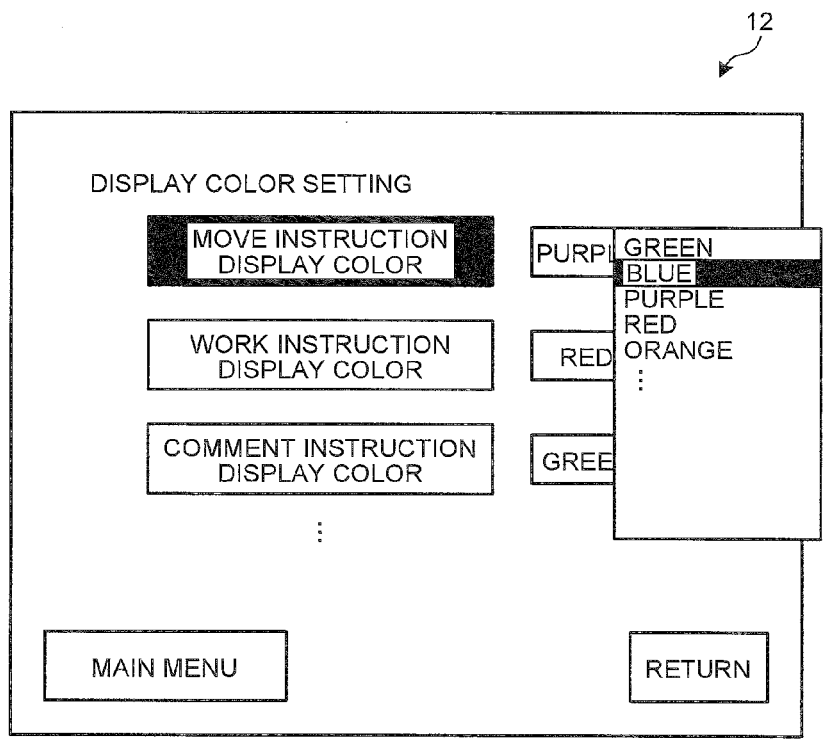
FIG. 4 is a diagram illustrating an example of a display color setting screen according to the first embodiment.

Next, the display unit 12 of the portable remote controller 10 according to the first embodiment is explained in detail with reference to FIGS. 3 and 4. FIG. 3 is a diagram illustrating an example of a process selection screen according to the first embodiment. FIG. 4 is a diagram illustrating an example of a display color setting screen according to the first embodiment. The examples of the screen are explained by using the partially simplified screen for easy explanation.

First, as illustrated in FIG. 3, the portable remote controller 10 includes the operating unit 11 and the display unit 12. The operating unit 11 includes an execution key 11a, an arrow key 11b, and a character enter key. Moreover, the display unit 12 displays a process selection screen on which a "various setting process of the portable remote controller 10" is selected from the main menu or the like to select a setting process of the portable remote controller 10.

Herein, when a "display color setting process" is selected by the worker, the portable remote controller 10 displays a display color setting screen as illustrated in FIG. 4. The display color setting screen displays color names set for the respective instructions. The portable remote controller 10 displays a list of settable display colors when a display color setting operation is received.

Specifically, when the execution key 11a is clicked in a state where a cursor is located on a part on which a "color name" corresponding to the "move instruction" is displayed, the portable remote controller 10 displays a list of settable display colors as illustrated in FIG. 4. In this case, it is assumed that the list of display colors displays colors that are registered as "the possible" in the list display identification of the color registration information 13a.

Then, when a predetermined color is selected by the worker and a setting operation for the display color is performed, the portable remote controller 10 updates color information (color name and color number) associated with the instruction of the display color information 13b in accordance with the selected color.

Herein, it has been explained that the portable remote controller 10 displays the list of display colors when the display color setting operation is received and the worker selects a setting color from the displayed list. However, the present embodiment is not limited to this. For example, the worker may directly input the "color number" and "RGB value" registered in the color registration information 13a from the operating unit 11 to set a display color.

Figure 5:
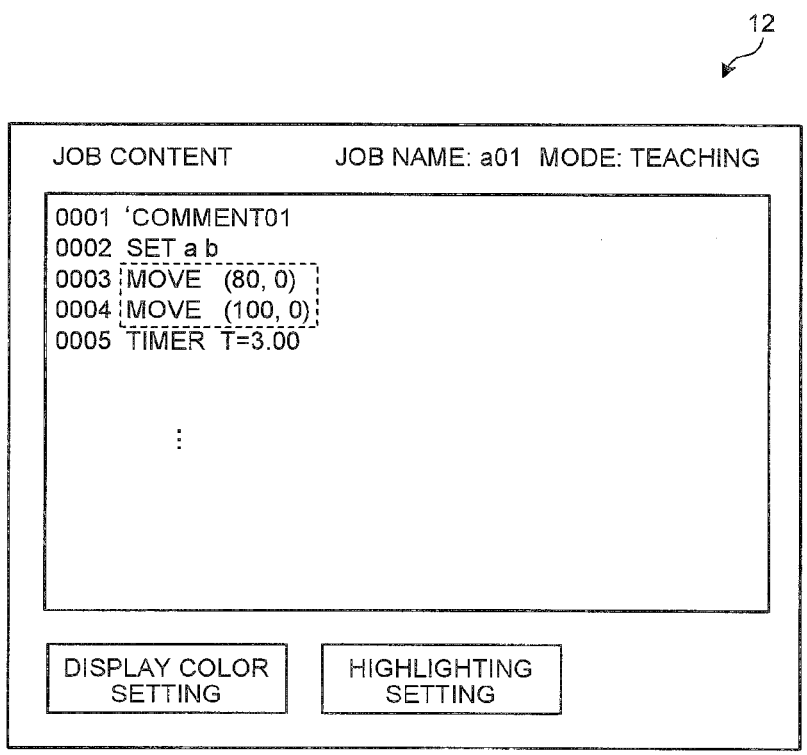
FIG. 5 is a diagram illustrating an example (1) of a teaching data display screen according to the first embodiment.
Figure 6A:
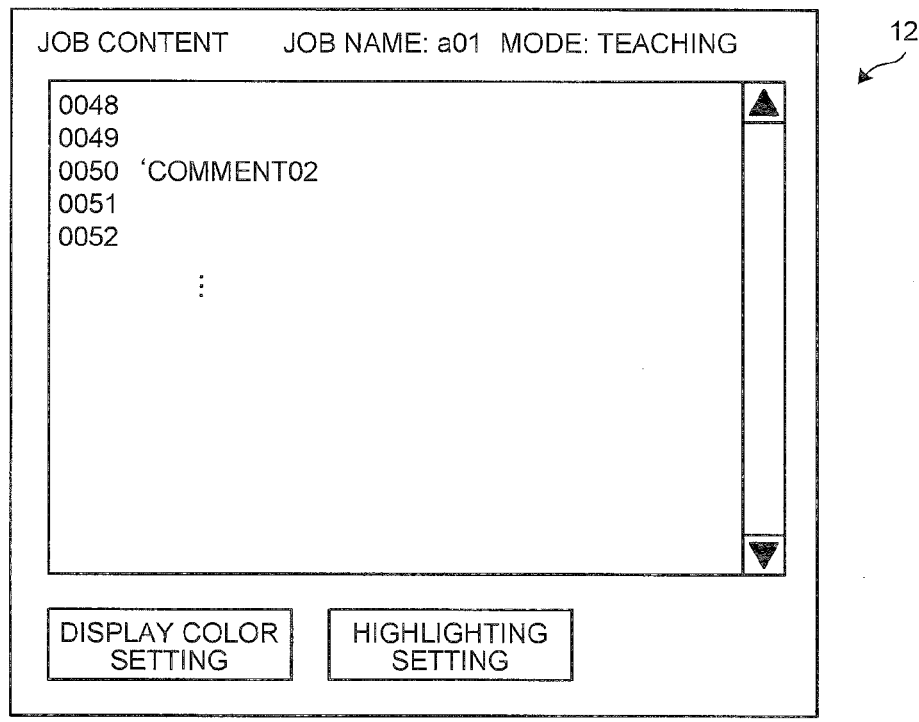
FIG. 6A is a diagram illustrating an example (2) of the teaching data display screen according to the first embodiment.
Figure 6B:
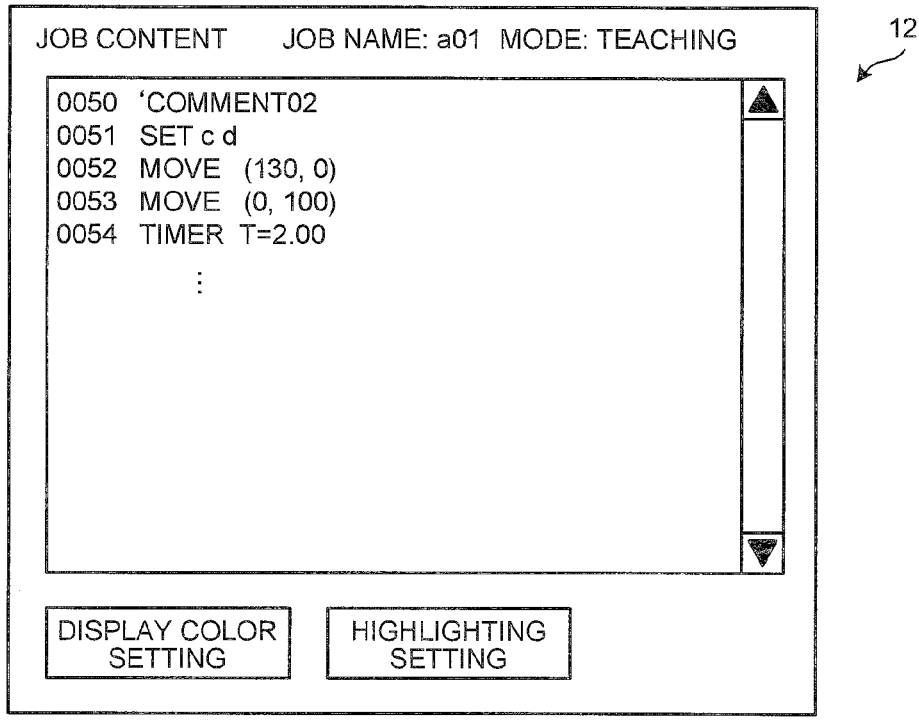
FIG. 6B is a diagram illustrating an example (3) of the teaching data display screen according to the first embodiment.

Next, the display screen of the teaching data 13c is explained with reference to FIGS. 5, 6A, and 6B. FIG. 5 is a diagram illustrating an example (1) of a teaching data display screen according to the first embodiment. FIG. 6A is a diagram illustrating an example (2) of the teaching data display screen according to the first embodiment. FIG. 6B is a diagram illustrating an example (3) of the teaching data display screen according to the first embodiment.

First, as illustrated in FIG. 5, the upper side of the display unit 12 displays a job name and a display mode of the displayed teaching data 13c. Herein, the upper side of the display unit 12 displays the job name "a01" and the display mode "teaching" and indicates that the teaching data 13c is being edited.

Moreover, the central part of the display unit 12 displays the teaching data 13c. Herein, a line number is displayed on the left edge of a line and a command corresponding to an instruction such as "SET" and "MOVE" is displayed next the line number.

If the display instruction of the teaching data 13c is received from the main menu or the like, the teaching data display unit 14c displays the teaching data 13c on the display unit 12 on the basis of the color information set in the display color information 13b.

For example, when "color name: blue" is set in the display color information 13b in association with "instruction name: move instruction", the teaching data display unit 14c displays characters of lines including the move instruction by using "blue".

Specifically, as illustrated in FIG. 5, the teaching data display unit 14c displays, by using "blue", lines including a command "MOVE" corresponding to "instruction name: move instruction", that is to say, characters in a part surrounded by a broken line.

Herein, it has been assumed that the teaching data display unit 14c displays the characters of the teaching data 13c by using the color set in the display color information 13b. However, the present embodiment is not limited to this. For example, the teaching data display unit 14c may display a background color for each instruction by using the color set in the display color information 13b.

Moreover, a display color and a background color may be set in the display color information 13b to display the teaching data 13c on the basis of the color information set in the display color information 13b.

Next, the lower side of the display unit 12 displays a "display color setting" button and a "highlighting setting" button. When a predetermined line or a part of the line is selected by the operation of the worker and the "display color setting" button is clicked by the worker, the portable remote controller 10 can temporarily change the display color of the selected line or the part of the line.

In this case, a temporarily changed display color may be selected by the worker by displaying a list of settable display colors when the "display color setting" button is clicked, or may be previously registered as a display color to be temporarily changed.

Moreover, when a predetermined line or a part of the line is selected by the operation of the worker and the "highlighting setting" button is clicked, the portable remote controller 10 can temporarily highlight the characters of the selected part. Herein, highlighting is to emphasize and display characters. For example, highlighting may be to display target characters by using a bold face or blinking.

A timing at which a display color is temporarily changed or at which highlighting is cancelled is not limited. For example, the timing may be a time at which a line different from the set line is selected and the "display color setting" button or the "highlighting setting" button is again clicked, or may be a time at which the display of the teaching data 13c is terminated.

Next, the case where a predetermined specified color is set in the display color information 13b in association with a predetermined instruction and the same character color as a background color is set in the display color information 13b in association with instructions other than the predetermined instruction is explained with reference to FIGS. 6A and 6B. Herein, the case where a predetermined instruction is a comment instruction is explained.

A comment instruction is an instruction that does not correspond to the behaviors of the robot 30 but that is described in any place of the teaching data 13c as an application such as "header" and "bookmark". For example, the comment instruction is described as "'COMMENT01", "'COMMENT02", and the like.

As illustrated in FIG. 6A, a line including the comment instruction displayed on the display unit 12 is displayed with a predetermined specified color and other lines are displayed with the same character color as the background color.

In this way, because a specified color is set for a comment instruction and the same character color as a background color is set for other instructions, the "comment instruction" that is a desired instruction can be easily visually recognized from the teaching data 13c displayed on the display unit 12.

Herein, the worker describes a comment instruction in many cases to easily search for a modification place of the teaching data 13c. Then, when the desired comment instruction is found, the worker modifies the teaching data 13c located near the comment instruction.

For this reason, it is assumed that the portable remote controller 10 performs the following process when the display color setting as described above is performed.

When a scrolling operation is stopped while the scrolling operation is being performed by using an arrow key or the like, the portable remote controller 10 determines that the worker has found a desired comment instruction and temporarily cancels setting of the same character color as the background color.

In other words, the portable remote controller 10 temporarily changes the character color that is the same color as the background color to a character color that can be visually recognized and modified by the worker. As a result, as illustrated in FIG. 6B, the lines other than the comment instruction line displayed on the display unit 12 are displayed with a display color that can be visually recognized.

After that, the portable remote controller 10 returns setting of the character color of the lines to the background color if the scrolling operation is again received, and then repeats the process described above when the scrolling operation is stopped.

By doing so, the worker can easily visually recognize a desired command and does not require an operation for changing display color setting every time the teaching data 13c is modified. As a result, the portable remote controller 10 can improve work efficiency related to modification.

Herein, it was assumed that the portable remote controller 10 causes a worker to visually recognize a desired command. However, when a desired instruction is specified by the operating unit 11, a voice input, or the like, the portable remote controller 10 may retrieve the instruction and display the teaching data 13c after skipping lines until the instruction is detected. Then, when a predetermined key is clicked, the portable remote controller 10 continues to retrieve such an instruction.

Herein, it was assumed that the portable remote controller 10 sequentially retrieves instructions. However, the portable remote controller 10 may temporarily extract all lines including a desired instruction and display all the lines on the display unit 12. Then, when a predetermined line is selected from the extracted lines, the portable remote controller 10 may skip lines up to the selected line to display the teaching data 13c. As a result, the worker can visually recognize a desired place from among the teaching data 13c having an enormous amount of lines.

Next, the routines of a display color setting process performed by the portable remote controller 10 are explained with reference to FIG. 8. FIG. 8 is a flowchart illustrating the routines of a display color setting process according to the first embodiment.

The case where the display color setting process is performed is explained from the state where "various settings of the portable remote controller 10" are selected by a worker from the main menu or the like and a process selection screen on which a setting process of the portable remote controller 10 is selected is displayed on the display unit 12.

As illustrated in FIG. 8, the portable remote controller 10 receives the selection of "display color setting" from the process selection screen (Step S101) and acquires the display color information 13b (Step S102).

Next, the instruction list display unit 14a displays a list of instructions and color names of display colors that are set in the acquired display color information 13b (Step S103).

Then, the display color setting unit 14b detects that the execution key 11a is clicked in the state where a cursor is moved to a color name corresponding to an instruction, and receives that an instruction for setting a display color is selected (Step S104).

After that, the display color setting unit 14b displays a list of settable display colors (Step S105) and receives that a setting color is selected from the list of display colors (Step S106).

Next, the display color setting unit 14b updates color information (color name and color number) associated with the instruction of the display color information 13b in accordance with the selected color (Step S107), and terminates the series of routines of the display color setting process.

Figure 9:
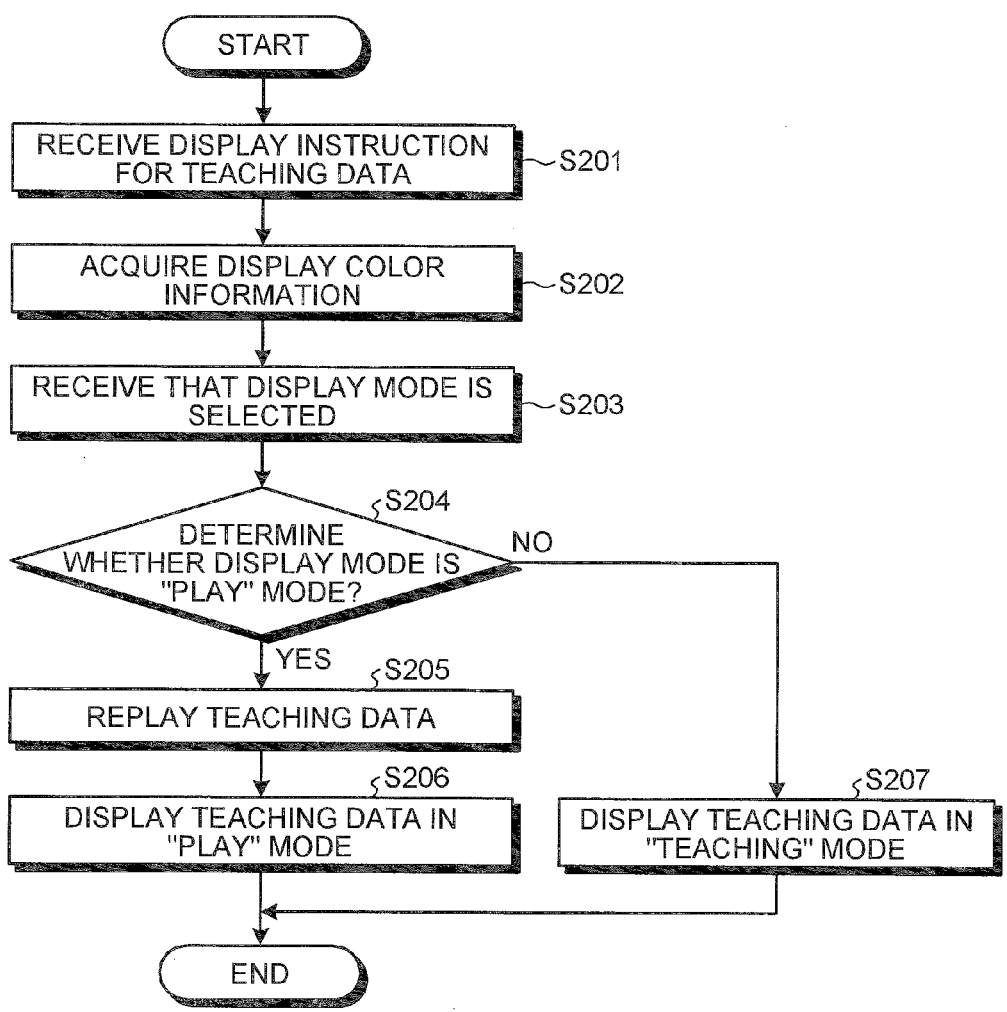
FIG. 9 is a flowchart illustrating the routines of a teaching data display process according to the first embodiment.

Next, the routines of a teaching data display process performed by the teaching data display unit 14c are explained with reference to FIG. 9. FIG. 9 is a flowchart illustrating the routines of a teaching data display process according to the first embodiment.

As illustrated in FIG. 9, the teaching data display unit 14c receives a display instruction for the predetermined teaching data 13c (Step S201), and acquires the display color information 13b (Step S202).

Then, the teaching data display unit 14c receives that a display mode is selected by the worker (Step S203), and determines whether the selected display mode is a "play" mode (Step S204).

When the selected display mode is a "play" mode (Step S204: Yes), the control unit 14 instructs the robot controller 20 to replay the teaching data 13c (Step S205).

Then, the teaching data display unit 14c displays the teaching data 13c on the display unit 12 in the "play" mode (Step S206) on the basis of color information set in the display color information 13b, and terminates the series of routines of the teaching data display process.

On the other hand, when the selected display mode is not the "play" mode but is a "teaching" mode (Step S204: No), the teaching data display unit 14c performs the following process. In this case, the teaching data display unit 14c displays the teaching data 13c on the display unit 12 in the "teaching" mode on the basis of the color information set in the display color information 13b (Step S207), and terminates the series of routines of the teaching data display process.

Herein, it was assumed that a display instruction for the teaching data 13c is received and then the selection of a display mode is performed. However, a screen and a button for selecting a process for "replaying the teaching data 13c" and a process for "editing the teaching data 13c" may be provided on the main menu or the like.

In this case, if the fact that the process for "replaying the teaching data 13c" is selected is received, the teaching data display unit 14c instructs the robot controller 20 to replay the predetermined teaching data 13c and displays the teaching data 13c on the display unit 12 in the "play" mode.

On the other hand, if the fact that the process for "editing the teaching data 13c" is selected is received, the teaching data display unit 14c displays the predetermined teaching data 13c on the display unit 12 in the "teaching" mode in which the teaching data can be edited.

As described above, it has been explained in the first embodiment that the portable remote controller that is an operating device for performing teaching displays teaching data on the basis of a display color set for each command when the teaching data is displayed on the display unit of the portable remote controller. As a result, the portable remote controller and the robotic system according to the first embodiment can easily visually recognize a command from the teaching data displayed on the display unit.

Meanwhile, in the portable remote controller according to the first embodiment described above, a specified color is set by a worker for a predetermined instruction and the same character color as a background color is set for other instructions.

However, the portable remote controller may provide priorities to display color information and display teaching data on the basis of the priorities and the color information set for instructions. Therefore, the case where a teaching data display process is performed on the basis of priorities is explained below.

Second Embodiment

FIG. 10 is a diagram illustrating an example of a display color information 13b' according to the second embodiment. The second embodiment of FIG. 10 is different from the first embodiment in that a "priority" item is added to the display color information 13b illustrated in FIG. 7. Because the configuration of the portable remote controller 10 is similar to that of the portable remote controller 10 illustrated in FIG. 2, the explanation of the configuration is omitted.

As illustrated in FIG. 10, the display color information 13b' includes an "instruction name" item, a "color name" item, a "color number" item, and a "priority" item. The "priority" item is a priority sequence of instructions to be visually recognized. The "priority" item may have the same value. The higher priority indicates that a worker further wishes to visually recognize the corresponding instruction. In this case, the higher "priority" has a smaller numeric value.

Furthermore, the portable remote controller 10 according to the second embodiment sets a reference priority as a priority that corresponds to a standard that indicates whether an instruction is displayed by using a display color.

Then, when displaying the teaching data 13c, the teaching data display unit 14c displays the teaching data 13c on the display unit 12 on the basis of the color information set in the display color information 13b' for the instructions that have priorities not less than a predetermined reference priority.

For example, the case where the highest-priority "1" is set for an A instruction, a priority "2" is set for C and F instructions, a priority "3" is set for B and E instructions, and a priority "4" is set for a D instruction is explained as illustrated in FIG. 10.

Specifically, when a reference priority is "2", the teaching data display unit 14c displays the teaching data 13c on the display unit 12 on the basis of color information of instructions of which the priorities are "1" and "2" not less than the reference priority.

Therefore, the teaching data display unit 14c displays the character colors of the A, C, and F instructions by using blue, green, and pink that are colors set in the display color information 13b'. On the other hand, the teaching data display unit 14c displays instructions that have priorities less than the reference priority by using the same character color as a background color.

The portable remote controller 10 according to the second embodiment can change setting of a reference priority even when the teaching data 13c is being displayed. For example, when a predetermined numeric keypad is long clicked, the portable remote controller 10 according to the second embodiment may determine that the reference priority is changed to a numeric value corresponding to the clicked numeric keypad.

As described above, the portable remote controller of the second embodiment sets priorities as display color information and displays teaching data on the basis of the priorities and a reference priority stored with color information set for instructions. As a result, the portable remote controller and the robotic system according to the second embodiment can easily visually recognize a command from the teaching data displayed on the display unit and can flexibly correspond to a visual recognition technique for a command.

It has been explained in the embodiments that the portable remote controller and the robot controller are connected to each other by using a cable. However, the present embodiment is not limited to this. For example, a wireless portable remote controller may transmit teaching data to the robot controller by radio to instruct the robot controller to replay the teaching data.

Moreover, it has been explained in the embodiments that the portable remote controller of the robotic system stores teaching data. However, the robot controller may store the teaching data taught by the portable remote controller.

Moreover, it has been explained in the embodiments that an input operation is received from the operating unit. However, the portable remote controller may include a microphone to receive an input operation through a voice input. As a result, because operation buttons provided in the portable remote controller are unnecessary, the operating unit can be minimized and the weight of the portable remote controller can be reduced. Furthermore, because the size of the display unit can be increased by minimizing the operating unit of the portable remote controller, a worker can easily visually recognize a command.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable remote controller comprising:
    a display color setting unit that sets display colors selected from a list of the display colors for instructions for making a manipulator that holds or moves a workpiece execute a predetermined behavior;
    a display color information storage unit that stores therein the display colors set by the display color setting unit in association with the respective instructions; and
    a teaching data display unit having a play mode to instruct a manipulator controller to replay teaching data for instructing the instructions to the manipulator, the teaching data display unit being configured to instruct the manipulator controller to replay the teaching data in the play mode and configured to display the teaching data on a display unit in the play mode on the basis of the display colors stored in the display color information storage unit in association with the instructions, the manipulator controller being configured to control the manipulator.

2. The portable remote controller according to claim 1, wherein the teaching data display unit temporarily changes a display color of the teaching data displayed on the display unit into a display color set by a predetermined operation to display the changed display color on the display unit.

3. The portable remote controller according to claim 1, wherein the display color setting unit allows that a character color and a background color are set to a same color as the display color.

4. The portable remote controller according to claim 1, wherein the teaching data display unit cancels that a character color and a background color are set to the same color on condition that a predetermined operation is received when displaying the teaching data in which the character color and the background color are set to the same color for instructions other than an instruction set by a predetermined specified color.

5. The portable remote controller according to claim 1, wherein
the teaching data display unit has a teaching mode to edit the teaching data for instructing the instructions to the manipulator, and
the teaching data display unit is configured to display the teaching data on the display unit in the teaching mode on the basis of the display colors stored in the display color information storage unit in association with the instructions.

6. A robotic system comprising:
a manipulator that holds or moves a workpiece;
a manipulator controller that controls a behavior of the manipulator on the basis of teaching data for instructing instructions to the manipulator; and
a portable remote controller, and the portable remote controller comprising:
a display color setting unit that sets display colors selected from a list of the display colors for the instructions for making the manipulator that holds or moves the workpiece execute a predetermined behavior;
a display color information storage unit that stores therein the display colors set by the display color setting unit in association with the respective instructions; and
a teaching data display unit having a play mode to instruct a manipulator controller to replay the teaching data for instructing the instructions to the manipulator, the teaching data display unit being configured to instruct the manipulator controller to replay the teaching data in the play mode and configured to display the teaching data on a display unit in the play mode on the basis of the display colors stored in the display color information storage unit in association with the instructions.

7. The robotic system according to claim 6, wherein
the teaching data display unit has a teaching mode to edit the teaching data for instructing the instructions to the manipulator, and
the teaching data display unit is configured to display the teaching data on the display unit in the teaching mode on the basis of the display colors stored in the display color information storage unit in association with the instructions.

8. A portable remote controller comprising:
a display color setting means that sets display colors selected from a list of the display colors for instructions for making a manipulator that holds or moves a workpiece execute a predetermined behavior;
a display color information storage means that stores therein the display colors set by the display color setting means in association with the respective instructions; and
a teaching data display means having a play mode to instruct a manipulator controller to replay teaching data for instructing the instructions to the manipulator, the teaching data display means being configured to instruct the manipulator controller to replay the teaching data in the play mode and configured to display the teaching data on a display means in the play mode on the basis of the display colors stored in the display color information storage means in association with the instructions, the manipulator controller being configured to control the manipulator.

9. The portable remote controller according to claim 8, wherein
the teaching data display means has a teaching mode to edit the teaching data for instructing the instructions to the manipulator, and
the teaching data display means is configured to display the teaching data on the display means in the teaching mode on the basis of the display colors stored in the display color information storage means in association with the instructions.

10. A portable remote controller comprising:
a display color setting unit that sets display colors selected from a list of the display colors for instructions for making a robot execute a predetermined behavior;
a display color information storage unit that stores therein the display colors set by the display color setting unit in association with the respective instructions; and
a teaching data display unit that displays teaching data for instructing the instructions to the robot on a display unit on the basis of the display colors stored in the display color information storage unit in association with the instructions,
wherein the teaching data display unit cancels a setting according to which a character color and a background color as the display color are set to the same color on condition that a scrolling operation is stopped when displaying the teaching data in which the character color and the background color are set to the same color for instructions other than an instruction set by a predetermined specified color.

11. The portable remote controller according to claim 10, wherein the teaching data display unit changes a setting back to a previous setting according to which the character color and the background color are set to the same color on condition that the scrolling operation is received.

12. A portable remote controller comprising:
a display color setting unit that sets display colors selected from a list of the display colors for instructions for making a robot execute a predetermined behavior;
a display color information storage unit that stores therein the display colors set by the display color setting unit in association with the respective instructions; and
a teaching data display unit that displays teaching data for instructing the instructions to the robot on a display unit on the basis of the display colors stored in the display color information storage unit in association with the instructions, wherein
the display color information storage unit stores therein the display colors in association with respective priorities and the respective instructions, and
the teaching data display unit changes to a setting according to which a character color and a background color as the display color are displayed in the same color when displaying the teaching data for which the priority lower than a changeable reference priority is set.

* * * * *